(12) United States Patent
Choong et al.

(10) Patent No.: US 12,549,798 B2
(45) Date of Patent: Feb. 10, 2026

(54) SMART TV REMOTE-CONTROL SYSTEM OR METHOD WITH NON-STANDARD RC COMMAND TRANSLATION CAPABILITY

(71) Applicant: Home Control Singapore PTE LTD, Singapore (SG)

(72) Inventors: Hon Shien Choong, Singapore (SG); Bin Yang Yap, Singapore (SG); Zayar Han Kyaw, Singapore (SG)

(73) Assignee: Home Control Singapore PTE LTD, Singapore (SG)

( * ) Notice: Subject to any disclaimer, the term of this patent is extended or adjusted under 35 U.S.C. 154(b) by 0 days.

(21) Appl. No.: 19/108,122

(22) PCT Filed: Dec. 15, 2023

(86) PCT No.: PCT/SG2023/050839
§ 371 (c)(1),
(2) Date: Feb. 28, 2025

(87) PCT Pub. No.: WO2025/127992
PCT Pub. Date: Jun. 19, 2025

(65) Prior Publication Data
US 2026/0006279 A1     Jan. 1, 2026

(51) Int. Cl.
*H04N 21/422* (2011.01)
*H04N 21/443* (2011.01)
*H04N 21/482* (2011.01)

(52) U.S. Cl.
CPC . *H04N 21/42225* (2013.01); *H04N 21/42227* (2013.01); *H04N 21/443* (2013.01); *H04N 21/482* (2013.01)

(58) Field of Classification Search
CPC ....... H04N 21/42225; H04N 21/42227; H04N 21/443; H04N 21/482

(Continued)

(56) References Cited

U.S. PATENT DOCUMENTS

| 2005/0096753 A1* | 5/2005 | Arling | H04L 12/282 |
| | | | 700/11 |
| 2009/0239587 A1* | 9/2009 | Negron | G08C 17/02 |
| | | | 455/566 |

(Continued)

FOREIGN PATENT DOCUMENTS

| CN | 105516767 A | 4/2016 | |
| CN | 107094238 A * | 8/2017 | ....... H04N 21/42206 |

(Continued)

OTHER PUBLICATIONS

International Preliminary Report on Patentability completed Dec. 23, 2024 for PCT Application No. PCT/SG2023/050839 filed Dec. 15, 2023, in 58 pages.

*Primary Examiner* — Benjamin R Bruckart
*Assistant Examiner* — Alexander Boyd
(74) *Attorney, Agent, or Firm* — Knobbe, Martens, Olson & Bear, LLP

(57) ABSTRACT

A smart TV remote-control (RC) system or method utilizing an operator app installed on a smart TV, a remote-control device configured to transmit a plurality of non-standard RC commands to the smart TV for program navigation, a translation app installed on the smart TV, and a display interface for viewing, in accordance with each program command. Each operator app is configured to receive a plurality of program commands, at least one program selection linked by the program address of the program command. The translation app is configured to receive each of the non-standard RC commands, access a database storing a plurality of mapping relationships, identify the program command associated with the non-standard RC command received based on the mapping relationships, and transmit the program command associated with the non-standard RC command to the operator app.

20 Claims, 2 Drawing Sheets

(58) Field of Classification Search
USPC ............................................................ 725/61
See application file for complete search history.

(56)          References Cited

U.S. PATENT DOCUMENTS

| | | | |
|---|---|---|---|
| 2010/0106867 A1* | 4/2010 | Ghorakavi | G06F 13/102 |
| | | | 710/33 |
| 2011/0304443 A1 | 12/2011 | Sheridan et al. | |
| 2014/0059628 A1* | 2/2014 | Kuo | H04N 21/482 |
| | | | 725/109 |
| 2016/0255418 A1 | 9/2016 | Zheng | |
| 2017/0026714 A1* | 1/2017 | Conan | H04N 21/6587 |
| 2017/0257593 A1* | 9/2017 | Candelore | H04N 21/42204 |
| 2018/0131993 A1* | 5/2018 | Han | H04N 21/6332 |

FOREIGN PATENT DOCUMENTS

| | | | | |
|---|---|---|---|---|
| CN | 112770150 A | * | 5/2021 | ......... H04N 21/4122 |
| CN | 115334343 A | * | 11/2022 | ......... H04N 21/4221 |
| WO | WO-2017156887 A1 | * | 9/2017 | ....... H04N 21/42221 |
| WO | WO 2022/100252 A1 | | 5/2022 | |

\* cited by examiner

SMART TV REMOTE-CONTROL SYSTEM OR METHOD WITH NON-STANDARD RC COMMAND TRANSLATION CAPABILITY

This application is a U.S. national stage application of PCT Patent Application No. PCT/SG2023/050839, filed Dec. 15, 2023, which is incorporated by reference in its entirety.

TECHNICAL CONTRIBUTION

The present invention generally relates to a smart TV remote-control system and, more particularly relate to a smart TV remote-control system that enables the translation of non-standard remote-control (RC) commands to a program command that includes a program address for a program selection.

BACKGROUND

Pay TV operators typically provide self-branded customer premise equipment (CPE) for users to consume their content. These include proprietary set-top boxes (STBs) or TVs capable of receiving encoded signals from satellite, cable, or an Internet protocol-based medium.

Over-the-top (OTT) services, such as those associated with the YouTube brand and the Netflix brand, offer their content in the form of operator applications (apps). Such operator apps can be run on retail smart TVs. Example operator apps running on smart TVs include but are not limited to the Tizen branded open-source app running on Samsung branded smart TVs and the webOS branded operator apps running on LG branded smart TVs. Various Android branded operator apps are also available for smart TVs. These operator apps may have an application programming interface (API) that defines a set of defined rules enabling separate applications to communicate effectively with the operator app.

However, on a smart TV, the operator app is just one of many apps provided by OTT services. In fact, the user would typically have access to a bundled TV remote, where other apps could be elevated to "partner" status above the operator app. Compared to proprietary boxes or TVs, the operator app thus has limited control over the experience of the end-user.

To address potential incompatibility issues or other difficulties in the use of operator apps, there is a need to improve the design of the smart TV control system to enhance better enable use of the operator apps. Other desirable features and characteristics will become apparent from the subsequent detailed description and the appended claims, taken in conjunction with the accompanying drawings and this background of the disclosure.

SUMMARY OF INVENTION

A first embodiment of the invention is a smart TV remote-control system comprising: (a) at least one operator app installed on a smart TV; (b) a remote-control device paired to the smart TV configured to transmit each of a plurality of non-standard remote-control (RC) commands directly or indirectly to a command receiver of the smart TV for program navigation; (c) a translation app integrated into the operator app as a library; and (d) a display interface for viewing, in accordance with each program command, the at least one program selection linked by the program address of the program command. Each operator app is configured to receive a plurality of program commands. Each program command includes at least one program address of a plurality of program addresses. Each program address includes information for linking to at least one program selection of a plurality of program selections via at least one program network. The non-standard RC commands are configured according to a non-standard protocol not processed by a standard TV input path. The translation app is configured to receive the non-standard commands. The translation app is configured to receive each of the non-standard RC commands from the remote-control device via the command receiver of the smart TV. The translation app is configured to access a database storing a plurality of mapping relationships, each mapping relationship associating one of the plurality of non-standard RC commands to one of the plurality of program commands. For each of the non-standard RC commands received, the translation app is configured to: (1) identify the program command associated with the non-standard RC command received based on the plurality of mapping relationships; and (2) transmit the program command associated with the non-standard RC command to the at least one operator app.

In some embodiments of the first embodiment: (a) each of the program selections addressable by the program commands are stored on at least one of a plurality of program servers; and (b) the program address of each program command is one of: (i) a uniform resource identifier (URI); and (ii) a program identifier associated with at least one of the program selections stored on one of the plurality of program servers.

In some embodiments of the first embodiment, the database is stored in a memory module of the smart TV for direct access by the translation app.

In some embodiments of the first embodiment, the database is stored off-site and the translation app is configured for data communication with the database via the at least one program network.

In some embodiments of the first embodiment, the translation app caches a local copy of at least a portion of the mapping relationships within a memory module of the smart TV.

In some embodiments of the first embodiment, indirect pairing of the remote-control device to the smart TV is performed between the remote-control device and a USB accessory insertable into a USB port of the smart TV.

In some embodiments of the first embodiment, the remote-control device is compatible with a plurality of smart TV models and brands.

In some embodiments of the first embodiment: (a) the remote-control device includes at least one customizable shortcut button assignable to one of a plurality of custom RC commands; (b) for each custom RC command, at least one of the mapping relationships of the database associates the custom RC command to a custom program command; and (c) each custom program command includes at least one custom program address.

In some embodiments of the first embodiment, the translation app is integrated with the at least one operator app and distributed as a single package within the smart TV.

In some embodiments of the first embodiment, the at least one program network includes at least one of: a local area network; an Internet network; a fibre optic network; a coaxial cable network; a terrestrial wireless network; and a satellite wireless network.

A second embodiment of the invention is a method of using a smart TV remote-control system comprising: (a) installing at least one operator app on a smart TV; (b) providing a remote-control device paired to the smart TV configured to transmit each of a plurality of non-standard remote-control (RC) commands directly or indirectly to a command receiver of the smart TV for program navigation; (c) installing a translation app on the smart TV; and (d) viewing on a display interface, in accordance with each program command, the at least one program selection linked by the program address of the program command. Each operator app is configured to receive a plurality of program commands. Each program command includes at least one program address of a plurality of program addresses. Each program address includes information for linking to at least one program selection of a plurality of program selections via at least one program network. The non-standard RC commands are configured according to a non-standard protocol not processed by a standard TV input path. The translation app is configured to receive the non-standard commands. The translation app is configured to receive each of the non-standard RC commands from the remote-control device via the command receiver of the smart TV. The translation app is configured to access a database storing a plurality of mapping relationships, each mapping relationship associating one of the plurality of non-standard RC commands to one of the plurality of program commands. For each of the non-standard RC commands received, the translation app is configured to: (1) identify the program command associated with the non-standard RC command received based on the plurality of mapping relationships; and (2) transmit the program command associated with the non-standard RC command to the at least one operator app.

In some embodiments of the second embodiment: (a) each of the program selections addressable by the program commands are stored on at least one of a plurality of program servers; and (b) the program address of each program command is one of: (i) a uniform resource identifier (URI); and (ii) a program identifier associated with at least one of the program selections stored on one of the plurality of program servers.

In some embodiments of the second embodiment, the database is stored in a memory module of the smart TV for direct access by the translation app.

In some embodiments of the second embodiment, the database is stored off-site and the translation app is configured for data communication with the database via the at least one program network.

In some embodiments of the second embodiment, the translation app caches a local copy of at least a portion of the mapping relationships within a memory module of the smart TV.

In some embodiments of the second embodiment, indirect pairing of the remote-control device to the smart TV is performed between the remote-control device and a USB accessory insertable into a USB port of the smart TV.

In some embodiments of the second embodiment, the remote-control device is compatible with a plurality of smart TV models and brands.

In some embodiments of the second embodiment: (a) the remote-control device includes at least one customizable shortcut button assignable to one of a plurality of custom RC commands; (b) for each custom RC command, at least one of the mapping relationships of the database associates the custom RC command to a custom program command; and (c) each custom program command includes at least one custom program address.

In some embodiments of the second embodiment, the translation app is integrated with the at least one operator app and distributed as a single package within the smart TV.

In some embodiments of the second embodiment, the at least one program network includes at least one of: a local area network; an Internet network; a fibre optic network; a coaxial cable network; a terrestrial wireless network; and a satellite wireless network.

The embodiments described herein are not exhaustive and that additional features and variations of the invention may be incorporated. Various other advantages and novel features of the invention will become apparent from the following detailed description when considered in conjunction with the accompanying drawings.

BRIEF DESCRIPTION OF THE DRAWINGS

Embodiments of the present disclosure are described herein with reference to the drawings in which.

DETAILED DESCRIPTION

Figure 1:
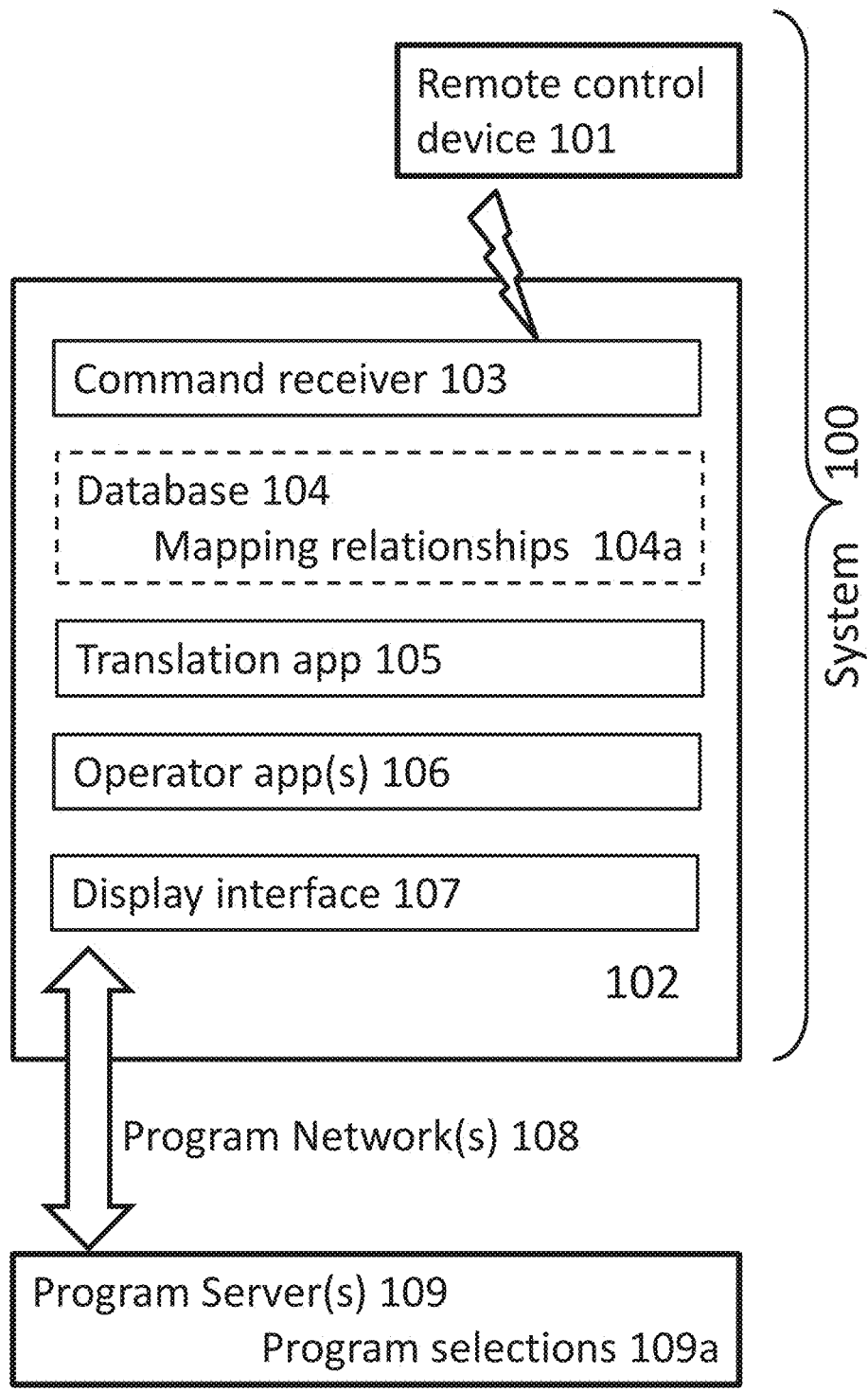
FIG. 1 is a schematic diagram of a smart TV remote-control system in accordance with an embodiment of the invention.

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein. Unless specified otherwise, the terms "comprising," "comprise," "including" and "include" used herein, and grammatical variants thereof, are intended to represent "open" or "inclusive" language such that they include recited elements but also permit inclusion of additional, un-recited elements.

The invention is a smart TV remote-control system or method utilizing an operator app installed on a smart TV, a remote-control device configured to transmit each of a plurality of non-standard remote-control (RC) commands to the smart TV for program navigation, a translation app installed on the smart TV, and a display interface for viewing, in accordance with each program command. Each operator app is configured to receive a plurality of program commands, at least one program selection linked by the program address of the program command. The translation app is configured to receive each of the non-standard RC commands, access a database storing a plurality of mapping relationships, identify the program command associated with the non-standard RC command received based on the plurality of mapping relationships, and transmit the program command associated with the non-standard RC command to the at least one operator app.

Pay TV operators are often in competition with other content providers, such as the video hosting site branded YouTube or the content provider branded Netflix. These content providers have their respective operator apps. It is possible that the same program selection (such as a specific movie or TV program) may be available for viewing or purchase on multiple operator apps. Thus, the ability to keep the end-user within a given operator app would increase the likelihood of consumption of content within said operator app, thus increasing revenue and improving retention rates for the content provider.

The current smart TV control system overcomes this problem by allowing various remote-control devices to gain direct access to various functions of operator apps. In so doing, the user experience on a retail smart TV can then be comparable to that on a proprietary set-top box or smart TV for the given operator app.

Many TV platforms allow for program commands that include a program address that links to specific program selections available on the Internet or proprietary servers. These program addresses are sometimes referred to a "user intents" or "deep links". The program selections can be for instance, specific video content, or settings menu or to a menu of video content (such as a subscriber page). The program addresses can be a uniform resource identifier (URI), a program identifier associated with a program selection stored on one of the program servers, or other content address. Hence, the program addresses links to program selections stored off-site. The program commands, hence, enable links to program selections which can be streamed to the smart TV via a program network for display by the smart TV on its display interface. Program networks can be implemented using a local area network, an Internet network, a fibre optic network, a coaxial cable network, a terrestrial wireless network, or a satellite wireless network.

A program address, for instance, could link to a specific program selection (e.g., a video or setting menu or a subscriber page) hosted on the video hosting site branded YouTube. The program address could also link to a program selection hosted in-app by an entertainment provider or a pay TV service operator.

The smart TV control system invention provides program navigation to program selections using a remote-control device by translating non-standard RC commands to program commands which include program addresses. Cross-references between non-standard RC commands and the program commands is provided by a database with mapping relationships.

FIG. 1 is a schematic diagram of a smart TV remote-control system 100 in accordance with an embodiment of the invention. The system 100 includes a remote-control device 101 and a smart TV 102. The smart TV 102 includes a command receiver 103, a database 104 with a plurality of mapping relationships 104a, a translation app 105, at least one operator app 106, and a display interface 107. The system 100 is in data communication with at least one program servers 109 via at least one program networks 108.

In FIG. 1, the database 104 with mapping relationships 104a are depicted as being installed on the smart TV 102 for direct access by the translation app 105. In this design, the database could be stored on a memory module of the smart TV 102. The memory module could comprise solid state memory.

In other embodiments of the invention, the database 104 (with its the mapping relationships 104a) is stored off-site. The translation app 105 is configured for data communication with the database 104 via the at least one program network 108. In this embodiment, the translation app can cache a local copy of at least a portion of the mapping relationships 104a within the memory module of the smart TV 102.

The remote-control device 101 permits users to control the smart TV 102 from a distance, eliminating the need for physical contact with the smart TV 102 itself. The remote-control device 101 can communicate directly with the smart TV 102 or indirectly such as through a USB accessory. The remote-control device 101 sends the non-standard RC commands to the smart TV 102 by pressing of buttons by the user.

The command receiver 103 receives the non-standard remote-control (RC) commands from the remote-control device 101 wirelessly. The command receiver 103 may provide for wireless communications under various modes or protocols, such as using the protocol branded Infra-Red, the protocol branded Bluetooth, the protocol branded Wi-Fi, Internet, a local area network, or a cellular network.

The database 104 stores mapping relationship 104a between the non-standard RC commands and the program commands. It can be structured list that pairs non-standard RC commands with the program commands. This mapping relationship can be organized in a tabular format, with one column for the non-standard RC commands and other columns for the meta data of the program command (including the program address). The mapping relationship between the non-standard RC commands to a program address can be one to one, multiple to one, one to multiple, or multiple to multiple.

For example, the user may press on a button of the remote-control device 101 to send the non-standard RC command to the smart TV 102 with the goal of watching a specific program selection that is streamed to the smart TV 102 from a program server 109 through a program network 108. The translation app 105 employs the mapping relationships 104a to bridge the gap between the non-standard RC command and the program selection so the user can view specific content.

The display interface 107 displays the program selection on the smart TV 102. The display interface 107 can be a touch screen, electronic ink (e-ink), organic light emitting diode (OLED), cathode ray tube, or liquid crystal display (LCD).

The smart TV remote-control system 100 may also include a processor and a memory among other components. Each of the components can be interconnected using various buses. The smart TV remote-control system 100 may include at least one processor for executing instructions that can be stored in a memory. As would be apparent to one of ordinary skill in the art, the device can include many types of memory, data storage or computer-readable media, such as a first data storage for program instructions for execution by the at least one processor, the same or separate storage can be used for images or data, a removable memory can be available for sharing information with other devices, and any number of communication approaches can be available for sharing with other devices.

Remote-control devices 101 are paired with smart TVs 102 to establish data communication between those two devices. The pairing process can be conducted by using the device IDs of the remote-control device 101 and the smart TV 102. The process of pairing two devices via their unique device IDs is a convenient and secure method for establishing a connection. It begins with both the remote-control device 101 and the smart TV 102 activating their pairing modes and generating distinctive device IDs. These IDs are then shared between the remote-control device 101 and the smart TV 102, allowing them to recognize each other during the pairing process. Authentication and verification steps may be included to enhance security. Once verified, the remote-control device 101 and the smart TV 102 establish a secure connection, and a confirmation message is displayed on the smart TV to inform users of the successful pairing. Once paired, the remote-control device 101 can send commands to the smart TV 102, allowing users to navigate through channels, adjust volume, access apps, and interact with the television. The non-standard RC commands are configured according to a non-standard protocol not processed by a standard TV input path. These non-standard RC commands can be proprietary protocols instead of typical HID protocols. The proprietary protocols will bypass the TV standard input path and instead be routed to the translation app.

Indirect pairing of the remote-control device to the smart TV can be performed between the remote-control device and a USB accessory insertable into a USB port of the smart TV. An example of accessory includes a USB dongle.

Figure 2:
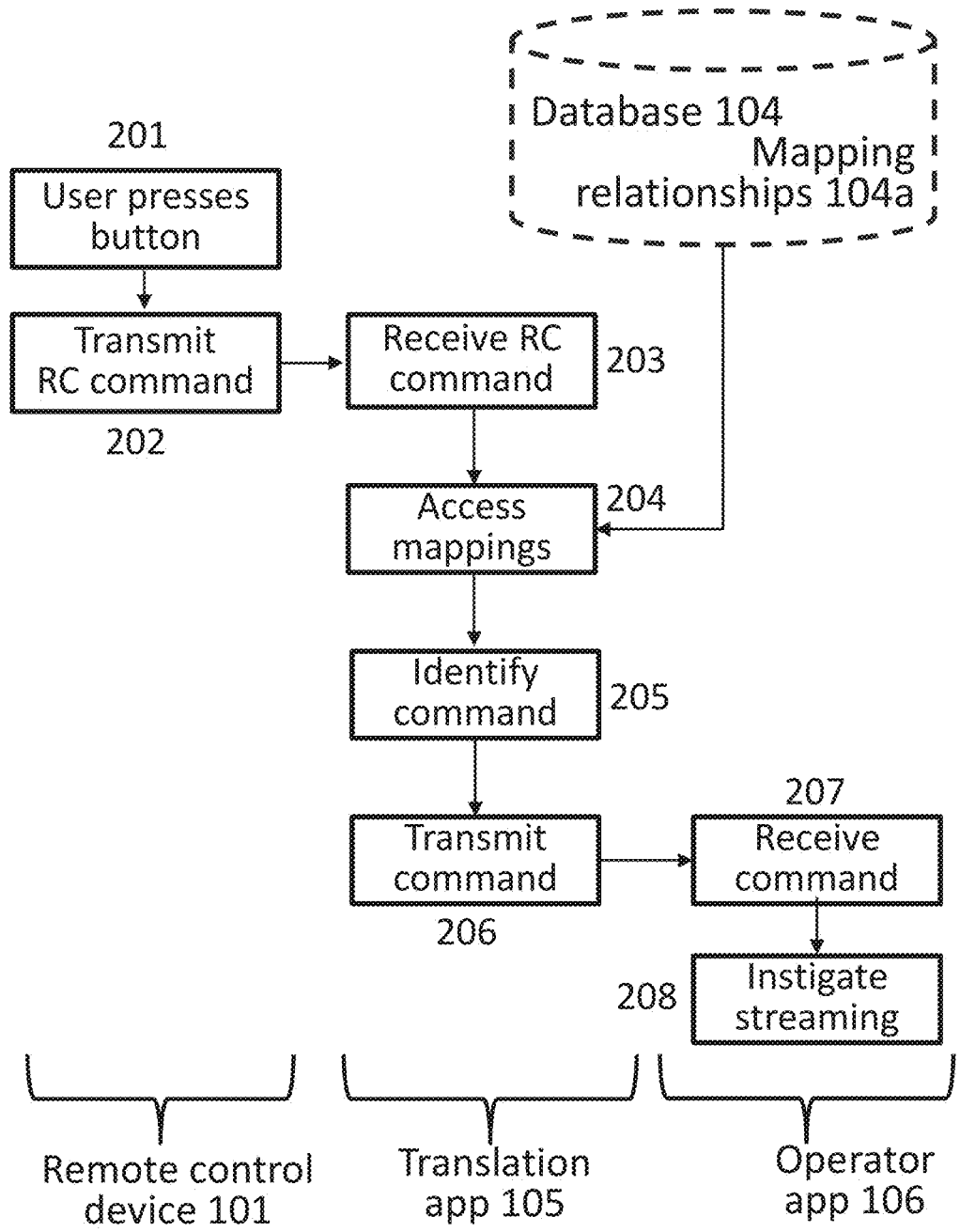
FIG. 2 is a flow chart of the method of operating a smart TV remote-control system in accordance with an embodiment.

FIG. 2 is a flow chart of the method of operating a smart TV remote-control system 100 in accordance with an embodiment.

At step 201, the user presses the button of the remote-control device 101 to generate a remote-control (RC) command.

At step 202, the non-standard RC command is transmitted to the smart TV 102. The remote-control device 101 is wirelessly communicated with the smart TV 102 directly or indirectly.

At step 203, the command receiver 103 of the smart TV 101 receives the non-standard RC command directly or indirectly from the remote-control device 101 at the command receiver 103. The receipt of the non-standard RC command could be, for instance, via a USB dongle.

At step 204, the translation app 105 accesses the mapping relationships 104a from the database 104. The translation app 105 is installed on the smart TV 102. The database 104 stores a plurality of mapping relationships, each mapping relationship associating one of the plurality of non-standard RC commands to one of the plurality of program commands.

At step 205, for each of the non-standard RC commands received, the translation app 105 is configured to identify the program command associated with the non-standard RC command received based on the plurality of mapping relationships.

At step 206, for each of the non-standard RC commands, the translation app 105 is configured to transmit the program command associated with the non-standard RC command to the at least one operator app. The program command includes the program address.

At step 207, the operator app 106 is configured to receive the program commands from the translation app 105. The program app 106 instigates streaming of program selections 109a by accessing program selections 109a from at least one program server 109 via at least one program network 108 according to the program address of the program command. The smart TV 102 may include media applications that assist in the streaming or control of the viewing experience for the program selections 109a viewed on the display interface 107 as instigated by the operator app 106.

For the method detailed in FIG. 2, the database 104 with mapping relationships 104a can be installed on the smart TV 102 for direct access by the translation app 105. In this design, the database could be stored on a memory module of the smart TV 102. The memory module could comprise solid state memory.

Alternatively, the database 104 (with its the mapping relationships 104a) can be stored off-site. The translation app 105 can be configured for data communication with the database 104 via the at least one program network 108. In this embodiment, the translation app can also cache a local copy of at least a portion of the mapping relationships 104a within the memory module of the smart TV 102.

A first embodiment of the invention is a smart TV remote-control system comprising: (a) at least one operator app installed on a smart TV; (b) a remote-control device paired to the smart TV configured to transmit each of a plurality of non-standard remote-control (RC) commands directly or indirectly to a command receiver of the smart TV for program navigation; (c) a translation app integrated into the operator app as a library; and (d) a display interface for viewing, in accordance with each program command, the at least one program selection linked by the program address of the program command. Each operator app is configured to receive a plurality of program commands. Each program command includes at least one program address of a plurality of program addresses. Each program address includes information for linking to at least one program selection of a plurality of program selections via at least one program network. The non-standard RC commands are configured according to a non-standard protocol not processed by a standard TV input path. The translation app is configured to receive the non-standard commands. The translation app is configured to receive each of the non-standard RC commands from the remote-control device via the command receiver of the smart TV. The translation app is configured to access a database storing a plurality of mapping relationships, each mapping relationship associating one of the plurality of non-standard RC commands to one of the plurality of program commands. For each of the non-standard RC commands received, the translation app is configured to: (1) identify the program command associated with the non-standard RC command received based on the plurality of mapping relationships; and (2) transmit the program command associated with the non-standard RC command to the at least one operator app.

A second embodiment of the invention is a method of using a smart TV remote-control system comprising: (a) installing at least one operator app on a smart TV; (b) providing a remote-control device paired to the smart TV configured to transmit each of a plurality of non-standard remote-control (RC) commands directly or indirectly to a command receiver of the smart TV for program navigation; (c) installing a translation app on the smart TV; and (d) viewing on a display interface, in accordance with each program command, the at least one program selection linked by the program address of the program command. Each operator app is configured to receive a plurality of program commands. Each program command includes at least one program address of a plurality of program addresses. Each program address includes information for linking to at least one program selection of a plurality of program selections via at least one program network. The non-standard RC commands are configured according to a non-standard protocol not processed by a standard TV input path. The translation app is configured to receive the non-standard commands. The translation app is configured to receive each of the non-standard RC commands from the remote-control device via the command receiver of the smart TV. The translation app is configured to access a database storing a plurality of mapping relationships, each mapping relationship associating one of the plurality of non-standard RC commands to one of the plurality of program commands. For each of the non-standard RC commands received, the translation app is configured to: (1) identify the program command associated with the non-standard RC command received based on the plurality of mapping relationships; and (2) transmit the program command associated with the non-standard RC command to the at least one operator app.

In an alternative embodiment of the first and second embodiment: (a) each of the program selections addressable by the program commands are stored on at least one of a plurality of program servers; and (b) the program address of each program command is one of: (i) a uniform resource identifier (URI); and (ii) a program identifier associated with at least one of the program selections stored on one of the plurality of program servers.

In an alternative embodiment of the first and second embodiment, the database is stored in a memory module of the smart TV for direct access by the translation app.

In an alternative embodiment of the first and second embodiment, the database is stored off-site and the translation app is configured for data communication with the database via the at least one program network.

In an alternative embodiment of the first and second embodiment, the translation app caches a local copy of at least a portion of the mapping relationships within a memory module of the smart TV.

In an alternative embodiment of the first and second embodiment, pairing of the remote-control device to the smart TV is performed between the remote-control device and a USB accessory insertable into a USB port of the smart TV.

In an alternative embodiment of the first and second embodiment, the remote-control device is compatible with a plurality of smart TV models and brands.

In an alternative embodiment of the first and second embodiment: (a) the remote-control device includes at least one customizable shortcut button assignable to one of a plurality of custom RC commands; (b) for each custom RC command, at least one of the mapping relationships of the database associates the custom RC command to a custom program command; and (c) each custom program command includes at least one custom program address.

Examples of this functionality include, but are not limited to: (i) pressing the "Sports" button on the remote-control device would launch the sports section within a given operator app; (ii) pressing the "ESPN" button on the remote-control device would launch the ESPN channel on a given operator app, even if the same channel is available on a separate different app. Tailoring the remote-control device with customizable shortcuts or assigning the most-watched channels, streaming platforms, or apps to specific buttons, allows for quick and easy access to the program.

In an alternative embodiment of the first and second embodiment, the translation app is integrated with the at least one operator app and distributed as a single package within the smart TV.

In an alternative embodiment of the first and second embodiment, the at least one program network includes at least one of: a local area network; an Internet network; a fibre optic network; a coaxial cable network; a terrestrial wireless network; and a satellite wireless network.

With the mapping relationships of the database, users can enjoy the convenience of issuing the non-standard RC commands that are automatically translated into the desired actions or functions on the smart TV. This simplifies the user experience and streamlines control over the smart TV. Mapping non-standard RC commands to specific program commands using the mapping relationships empowers users to interact with their smart TVs more intuitively and efficiently. There is no more searching through endless content and the desired content is just a command away.

As detailed above, the smart TV remote-control system redefines the way users interact with their smart TVs. It offers an integrated solution that seamlessly communicates with the television, provides a comprehensive database of program commands, utilizes up to date mapping relationships for precise non-standard RC command interpretation. This convenient design enhances the overall user experience.

While various aspects and embodiments have been disclosed herein, it will be apparent that various other modifications and adaptations of the invention will be apparent to the person skilled in the art after reading the foregoing disclosure without departing from the spirit and scope of the invention and it is intended that all such modifications and adaptations come within the scope of the appended claims. The various aspects and embodiments disclosed herein are for purposes of illustration and are not intended to be limiting, with the true scope and spirit of the invention being indicated by the appended claims.

The invention claimed is:

1. A smart TV remote-control system comprising:
   (a) at least one operator app installed on a smart TV,
      (i) wherein each operator app is configured to receive a plurality of program commands;
      (ii) wherein each program command includes at least one program address of a plurality of program addresses; and
      (iii) wherein each program address includes information for linking to at least one program selection of a plurality of program selections via at least one program network;
   (b) a remote-control device paired to the smart TV configured to transmit each of a plurality of non-standard remote-control (RC) commands directly or indirectly to a command receiver of the smart TV for program navigation, wherein the non-standard RC commands are configured according to a non-standard protocol not processed by a standard TV input path, the non-standard RC commands are using a proprietary protocol instead of a HID protocol and the proprietary protocol bypasses the TV standard input path and instead is routed to a translation app;
   (c) the translation app integrated into the operator app as a library or packaged as a standalone app,
      (i) wherein the translation app is configured to receive the non-standard commands;
      (ii) wherein the translation app is configured to receive each of the non-standard RC commands from the remote-control device via the command receiver of the smart TV;
      (iii) wherein the translation app is configured to access a database storing a plurality of mapping relationships, each mapping relationship associating one of the plurality of non-standard RC commands to one of the plurality of program commands;
      (iv) wherein, for each of the non-standard RC commands received, the translation app is configured to:
         (1) identify the program command associated with the non-standard RC command received based on the plurality of mapping relationships; and
         (2) transmit the program command associated with the non-standard RC command to the at least one operator app; and
   (d) a display interface for viewing, in accordance with each program command, the at least one program selection linked by the program address of the program command.

2. The system of claim 1,
   (a) wherein each of the program selections addressable by the program commands are stored on at least one of a plurality of program servers; and
   (b) wherein the program address of each program command is one of:
      (i) a uniform resource identifier (URI); and (ii) a program identifier associated with at least one of the program selections stored on one of the plurality of program servers.

3. The system of claim 1, wherein the database is stored in a memory module of the smart TV for direct access by the translation app.

4. The system of claim 1, wherein the database is stored off-site and the translation app is configured for data communication with the database via the at least one program network.

5. The system of claim 4, wherein the translation app caches a local copy of at least a portion of the mapping relationships within a memory module of the smart TV.

6. The system of claim 1, wherein indirect pairing of the remote-control device to the smart TV is performed between the remote-control device and a USB accessory insertable into a USB port of the smart TV.

7. The system of claim 1, wherein the remote-control device is compatible with a plurality of smart TV models and brands.

8. The system of claim 1,
wherein the remote-control device includes at least one customizable shortcut button assignable to one of a plurality of custom RC commands;
wherein, for each custom RC command, at least one of the mapping relationships of the database associates the custom RC command to a custom program command; and
wherein each custom program command includes at least one custom program address.

9. The system of claim 1, wherein the translation app is integrated with the at least one operator app and distributed as a single package within the smart TV.

10. The system of claim 1, wherein the at least one program network includes at least one of: a local area network; an Internet network; a fibre optic network; a coaxial cable network; a terrestrial wireless network; and a satellite wireless network.

11. A method of using a smart TV remote-control system comprising:
(a) installing at least one operator app on a smart TV,
  (i) wherein each operator app is configured to receive a plurality of program commands;
  (ii) wherein each program command includes at least one program address of a plurality of program addresses; and
  (iii) wherein each program address includes information for linking to at least one program selection of a plurality of program selections via at least one program network;
(b) providing a remote-control device paired to the smart TV configured to transmit each of a plurality of non-standard remote-control (RC) commands directly or indirectly to a command receiver of the smart TV for program navigation, wherein the non-standard RC commands are configured according to a non-standard protocol not processed by a standard TV input path, the non-standard RC commands are using a proprietary protocol instead of a HID protocol and the proprietary protocol bypasses the TV standard input path and instead is routed to a translation app;
(c) installing the translation app on the smart TV as a library or packaged as a standalone app,
  (i) wherein the translation app is configured to receive the non-standard commands;
  (ii) wherein the translation app is configured to receive each of the non-standard RC commands from the remote-control device via the command receiver of the smart TV;
  (iii) wherein the translation app is configured to access a database storing a plurality of mapping relationships, each mapping relationship associating one of the plurality of non-standard RC commands to one of the plurality of program commands;
  (iv) wherein, for each of the non-standard RC commands received, the translation app is configured to:
    (1) identify the program command associated with the non-standard RC command received based on the plurality of mapping relationships; and
    (2) transmit the program command associated with the non-standard RC command to the at least one operator app; and
(d) viewing on a display interface, in accordance with each program command, the at least one program selection linked by the program address of the program command.

12. The method of claim 11,
(a) wherein each of the program selections addressable by the program commands are stored on at least one of a plurality of program servers; and
(b) wherein the program address of each program command is one of:
  (i) a uniform resource identifier (URI); and
  (ii) a program identifier associated with at least one of the program selections stored on one of the plurality of program servers.

13. The method of claim 11, wherein the database is stored in a memory module of the smart TV for direct access by the translation app.

14. The method of claim 11, wherein the database is stored off-site and the translation app is configured for data communication with the database via the at least one program network.

15. The method of claim 14, wherein the translation app caches a local copy of at least a portion of the mapping relationships within a memory module of the smart TV.

16. The method of claim 11, wherein indirect pairing of the remote-control device to the smart TV is performed between the remote-control device and a USB accessory insertable into a USB port of the smart TV.

17. The method of claim 11, wherein the remote-control device is compatible with a plurality of smart TV models and brands.

18. The method of claim 11,
wherein the remote-control device includes at least one customizable shortcut button assignable to one of a plurality of custom RC commands;
wherein, for each custom RC command, at least one of the mapping relationships of the database associates the custom RC command to a custom program command; and
wherein each custom program command includes at least one custom program address.

19. The method of claim 11, wherein the translation app is integrated with the at least one operator app and distributed as a single package within the smart TV.

20. The method of claim 11, wherein the at least one program network includes at least one of: a local area network; an Internet network; a fibre optic network; a coaxial cable network; a terrestrial wireless network; and a satellite wireless network.

* * * * *